United States Patent

Schwartz et al.

(10) Patent No.: US 9,473,632 B2
(45) Date of Patent: Oct. 18, 2016

(54) SYSTEM AND METHOD TO IMPROVE SELF-SERVICE EXPERIENCE AND OPTIMIZE CONTACT CENTER RESOURCES

(71) Applicant: Avaya Inc., Santa Clara, CA (US)

(72) Inventors: Yolanda Schwartz, Sunnyvale, CA (US); Shmuel Shaffer, Palo Alto, CA (US); Michael Krack, St. Pete Beach, FL (US); Aaron Lepold, Los Gatos, CA (US)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 14/469,627

(22) Filed: Aug. 27, 2014

(65) Prior Publication Data

US 2016/0065738 A1 Mar. 3, 2016

(51) Int. Cl.
- *H04M 3/00* (2006.01)
- *H04M 5/00* (2006.01)
- *H04M 3/51* (2006.01)
- *G06Q 30/00* (2012.01)

(52) U.S. Cl.
CPC ......... *H04M 3/5175* (2013.01); *G06Q 30/016* (2013.01)

(58) Field of Classification Search
CPC ........... H04M 3/5166; H04M 3/5232; H04M 3/523; H04M 3/5158; H04M 7/006
USPC .......... 379/265.03, 266.01, 80, 88.03, 88.01, 379/265.05, 265.11, 265.01, 265.02
See application file for complete search history.

(56) References Cited

U.S. PATENT DOCUMENTS

| | | | |
|---|---|---|---|
| 5,206,903 A | 4/1993 | Kohler et al. | |
| 5,828,747 A | 10/1998 | Fisher et al. | |
| 5,905,793 A | 5/1999 | Flockhart et al. | |
| 5,982,873 A | 11/1999 | Flockhart et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 7,436,948 B1 | 10/2008 | Thenthiruperai | |
| 7,689,426 B2 * | 3/2010 | Matula ................ | H04M 3/4938 379/265.03 |
| 8,374,327 B2 | 2/2013 | Hartman et al. | |
| 8,806,275 B1 * | 8/2014 | Vannatter ............... | G06Q 10/00 714/2 |
| 2004/0264677 A1 | 12/2004 | Horvitz et al. | |
| 2013/0336466 A1 | 12/2013 | Malik et al. | |
| 2015/0055773 A1 * | 2/2015 | Brimshan ........... | H04M 3/5166 379/266.01 |

OTHER PUBLICATIONS

Genesys, "Intelligent Customer Front Door", retrieved on May 13, 2015 from http://www.genesys.com/echopass/enhancing-the-customer-experience/intelligent-customer-front-door, 2 Pages.

* cited by examiner

*Primary Examiner* — Thjuan K Addy

(57) ABSTRACT

System and method to improve self-service operation in a contact center, the method including: monitoring progress of a self-service customer support session for a customer of the contact center; monitoring surplus status of agents in the contact center; determining a system state related to the customer by use of the monitored progress and the monitored surplus status; setting an indicator signal to a first state if the system state is in an agent-support domain, otherwise setting the indicator signal to a second state if the system state is in an self-support domain; and assigning the customer to an agent-supported session if the indicator signal is in the first state.

20 Claims, 7 Drawing Sheets

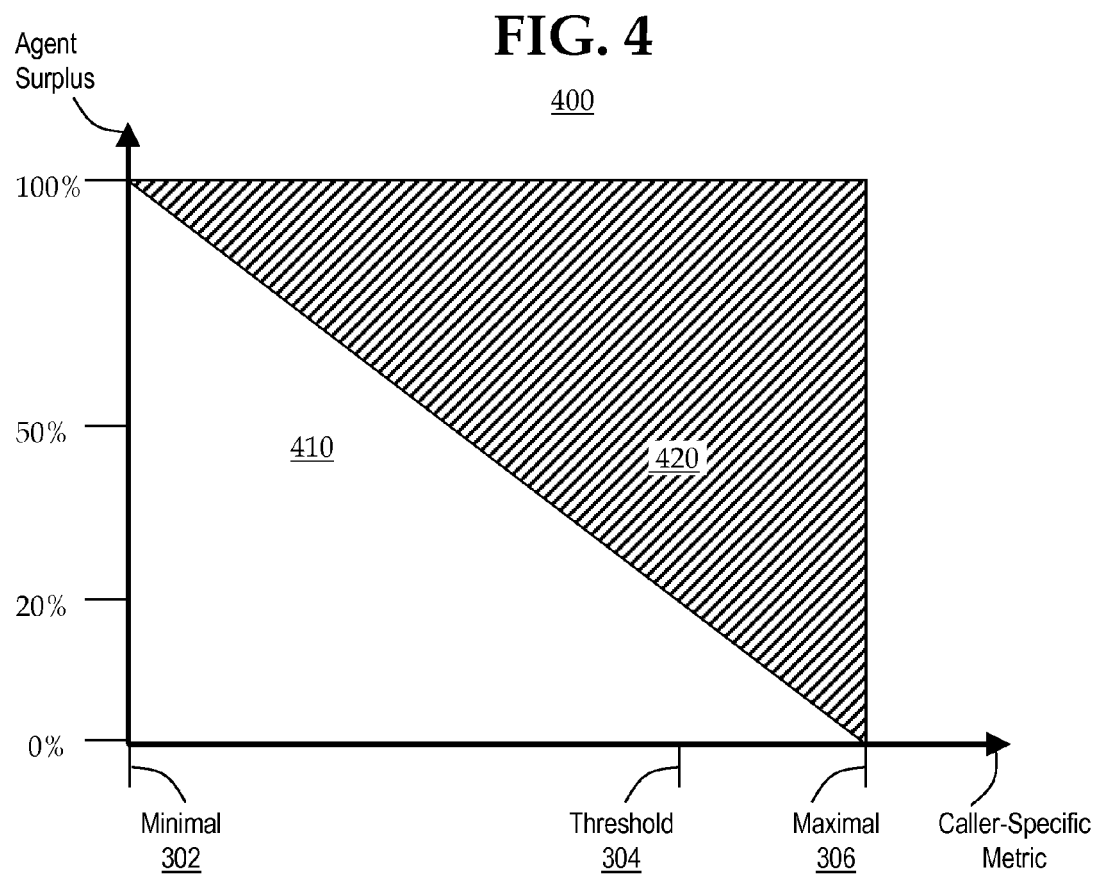

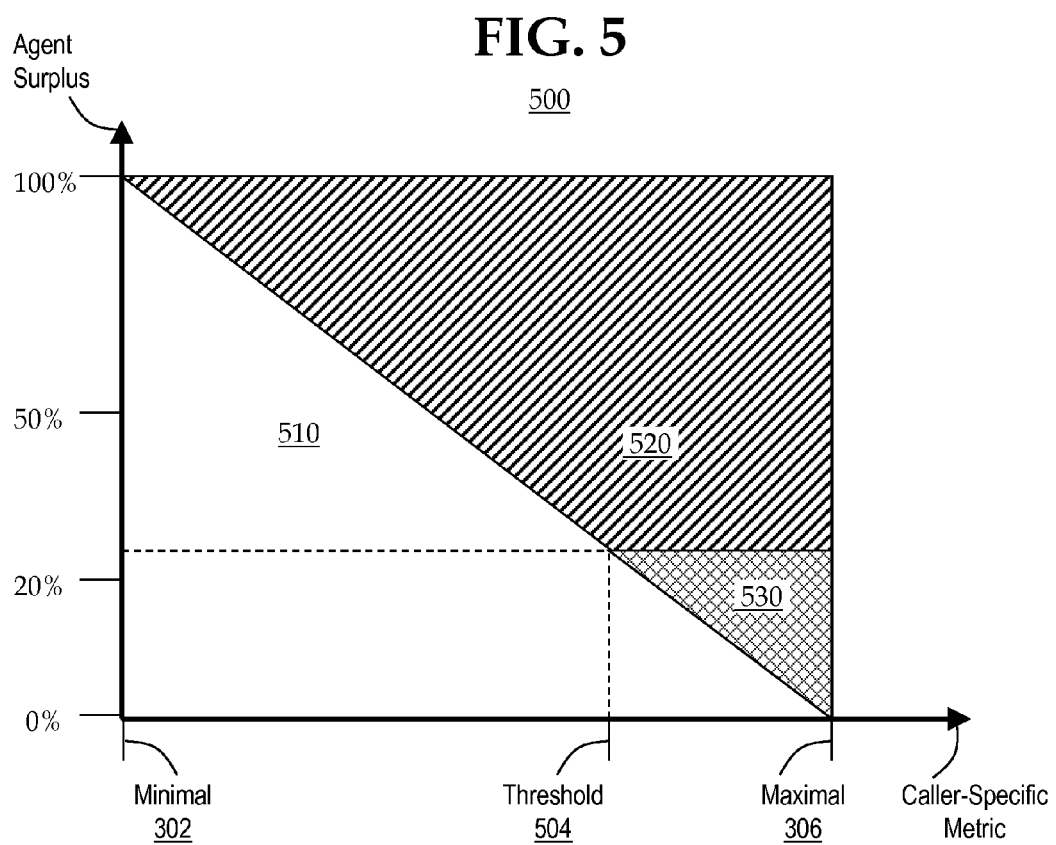

FIG. 6
600

| | Progress Score (1.0 no difficulties, 0.1 very challenged) | Surplus Inbound Agent Pool Size (% available) | Outbound Agent Pool Size (% available) | Provide Immediate Assistance | Offer On time Callback *** | Offer to wait in queue per system EWT |
|---|---|---|---|---|---|---|
| | 601 | 603 | 605 | 607 | 609 | 611 |
| 652 | 0.1 | >50% | * | Yes | | |
| 654 | 0.8 | >80% | * | Yes | | |
| 656 | 0.1 | ** | >50% | Yes - Blending | | |
| 658 | 0.8 | ** | >80% | Yes - Blending | | |
| 660 | 0.1 | <50% | >80% | Yes - Blending | | |
| 662 | 0.8 | <80% | <50% | No | | Yes |
| 664 | 0.1 | <80% | <50% | No | Yes | |

* Not relevant because the large pool of inbound agents ready to assist
** Not relevant because the large pool of outbound agent that can be converted.
*** The system will ensure that the committed call back time will be honored (doing blending if needed) vs. having a normal call back with potentially less accuracy in the actual time of the call back.

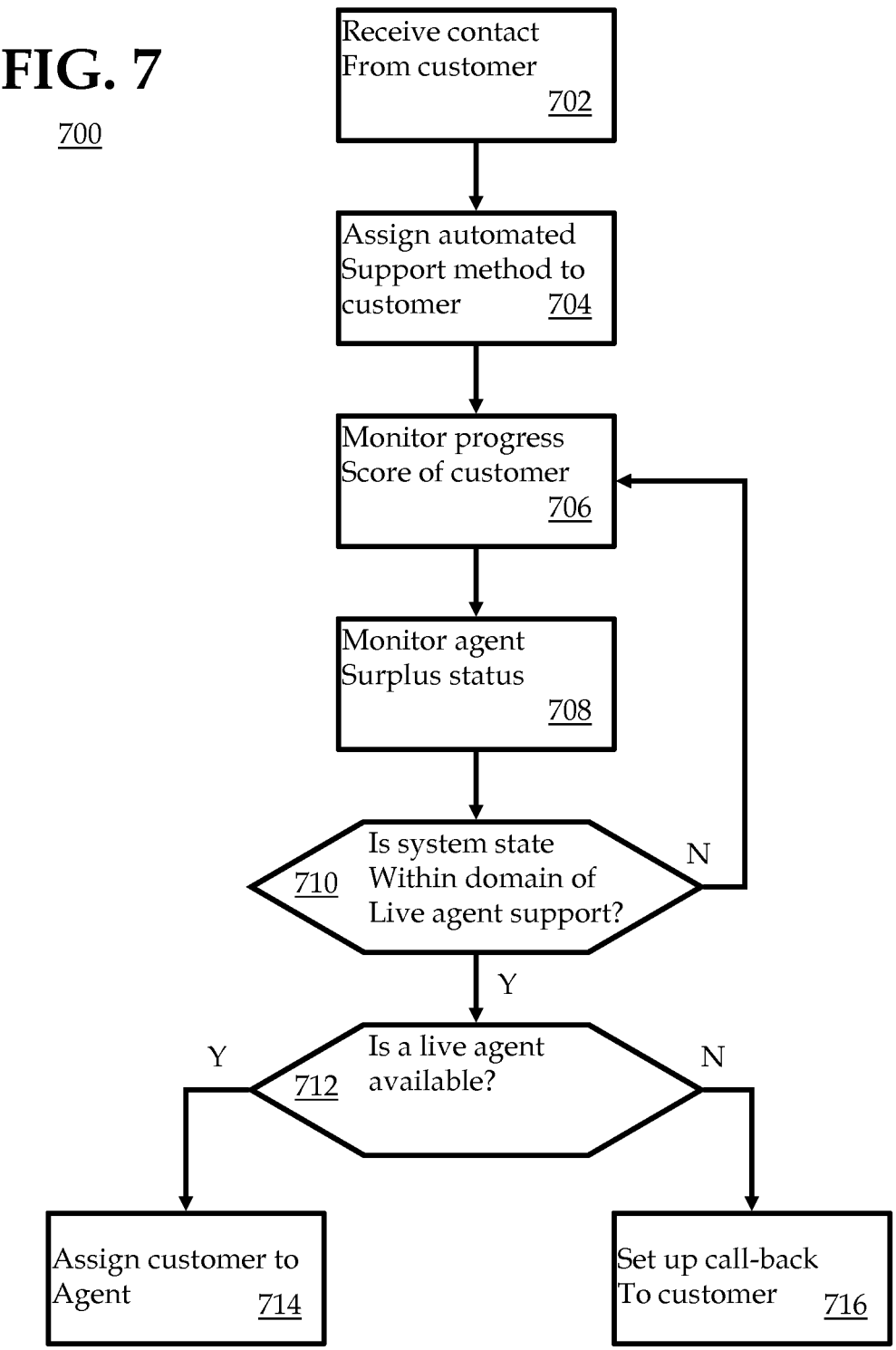

SYSTEM AND METHOD TO IMPROVE SELF-SERVICE EXPERIENCE AND OPTIMIZE CONTACT CENTER RESOURCES

BACKGROUND

1. Field

Embodiments of the present invention generally relate to improving self-service operation of a contact center, and, in particular, to a system and method for detecting and transitioning a customer from self-service support to agent support.

2. Description of Related Art

Some systems of the known art are able to integrate customer relations management (CRM) processes and back-office data, in order to offer a dynamic and self-service IVR system. Such systems integrate with back-end systems in order to identify customers and prospects and select an appropriate voice treatment according to customer segment and/or status.

Some methods of the known art such as U.S. Patent Application Publication No. 20130336466 provide a method to dynamically change an IVR system. Responses to a menu of prompts are monitored. Responsive to the responses, a presentation order of the menu of prompts is automatically updated according to a set of rules. The set of rules describes qualifications for dynamically changing the menu of prompts based on the responses.

Some methods of the known art such as U.S. Pat. No. 8,374,327 to Harman et al. provide and manage, for each of a plurality of callers, call handling treatments to callers interacting with an automated call-handling system.

Some methods of the known art, such as U.S. Pat. No. 7,436,948 to Thenthiruperai, determine that a caller may require assistance based solely on the amount of time in an IVR tree. These callers are transferred to an operator where they may end up waiting in a lengthy queue. This could make a frustrated caller more frustrated.

Some methods of the known art, such as U.S. Patent Application Publication No. 20040264677 to Horvitz et al., transfer a caller to an agent if a likelihood of success is low enough to justify the cost. This may be counterproductive if the caller ends up waiting in a lengthy queue. Systems such as Horvitz embrace a "good enough to keep in IVR" experience.

Therefore, a need exists to provide improved self-service operation of a contact center, and, in particular, to a system and method for detecting and transitioning a customer from self-service support to agent support, in order to provide improved customer satisfaction, and ultimately higher sales and lower operational cost.

BRIEF SUMMARY

Embodiments of the present invention generally relate to improving self-service operation of a contact center, and, in particular, to a system and method for detecting and transitioning a customer from self-service support to agent support.

In one embodiment, a method to improve self-service operation in a contact center includes: monitoring progress of a self-service customer support session for a customer of the contact center; monitoring surplus status of agents in the contact center; determining a system state related to the customer by use of the monitored progress and the monitored surplus status; setting an indicator signal to a first state if the system state is in an agent-support domain, otherwise setting the indicator signal to a second state if the system state is in an self-support domain; and assigning the customer to an agent-supported session if the indicator signal is in the first state.

In one embodiment, a system to improve self-service operation in a contact center may include: a monitor module configured to monitor progress of a self-service customer support session for a customer of the contact center and to monitor surplus status of agents in the contact center; a processor coupled to a memory and coupled to the monitor module, the processor configured to calculate a caller metric to characterize lack of monitored progress, wherein the caller metric varies inversely with monitored progress; a decision module configured to determine a system state related to the customer by use of the monitored progress and the monitored surplus status; a signal generator configured to set an indicator signal to a first state if the system state is in an agent-support domain, otherwise setting the indicator signal to a second state if the system state is in a self-support domain; and an assignment module configured to assign the customer to an agent-supported customer support session if the indicator signal is in the first state.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 4 illustrates an operational domain of a single contact for a self-service-enabled contact center in accordance with an embodiment of the present disclosure;

FIG. 5 illustrates an operational domain of a single contact for a self-service-enabled contact center in accordance with another embodiment of the present disclosure;

FIG. 6 illustrates a state table in accordance with an embodiment of the present disclosure; and FIG. 7 illustrates a process in accordance with an embodiment of the present disclosure.

Figure 1:
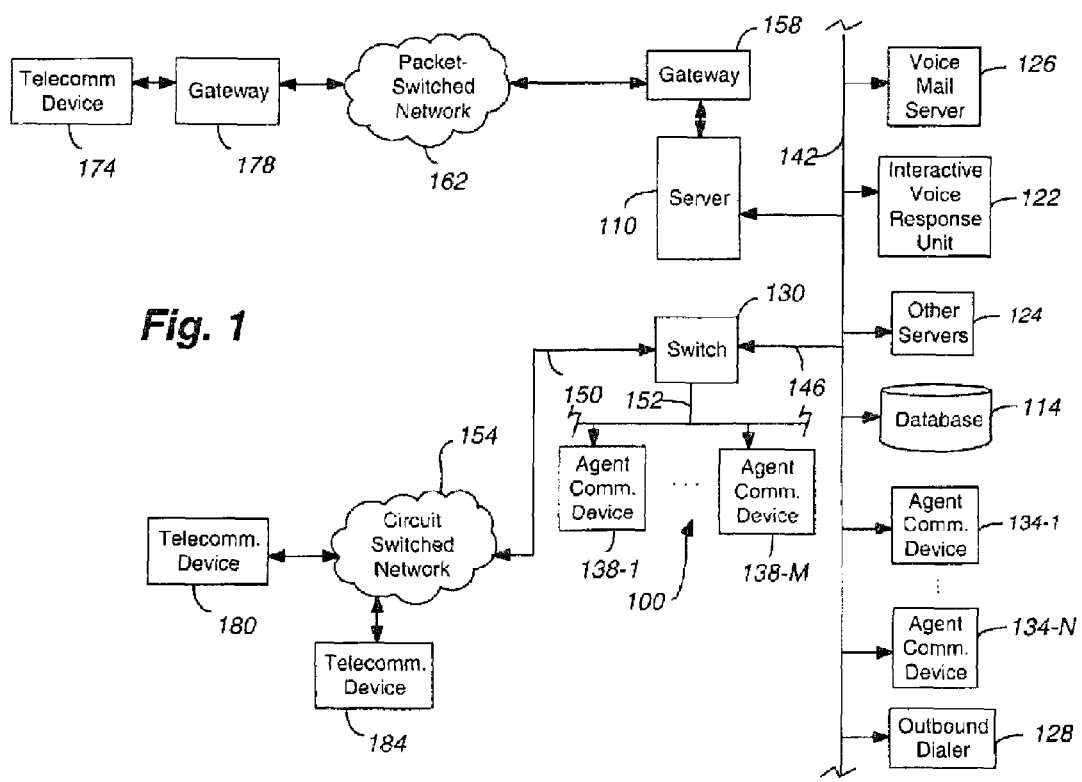
FIG. 1 is a block diagram depicting a contact center in accordance with an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize self-service and agent-assisted features of a contact center.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like. The term "server" where used may refer to an individual server or a cluster of servers, unless a different meaning is clearly indicated.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible, non-transitory storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit (IVR) 122, and other servers 124, an outbound dialer 128, a switch 130, a plurality of working agents operating packet-switched (first) telecommunication devices 134-1 to N (such as, but not limited to, computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as, but not limited to, via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones running on any hardware platform such as PCs, Macs, smartphones, or tablets, (such as Avaya Inc.'s, IP Softphone™); Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network such as, but not limited to, the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and may include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

In handling incoming calls, a contact center is capable of exchanging Internet Protocol (IP) data packets, Session Initiation Protocol (SIP) messages, Voice over IP (VoIP) traffic, and stream-related messages (e.g., Real Time Streaming Protocol [RTSP] messages, etc.) with calling endpoints such as endpoint 202. As those who are skilled in the art will appreciate, after reading this specification, contact center 210 is capable of communicating by using other protocols, in some alternative embodiments.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource such as, but not limited to, the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2A:
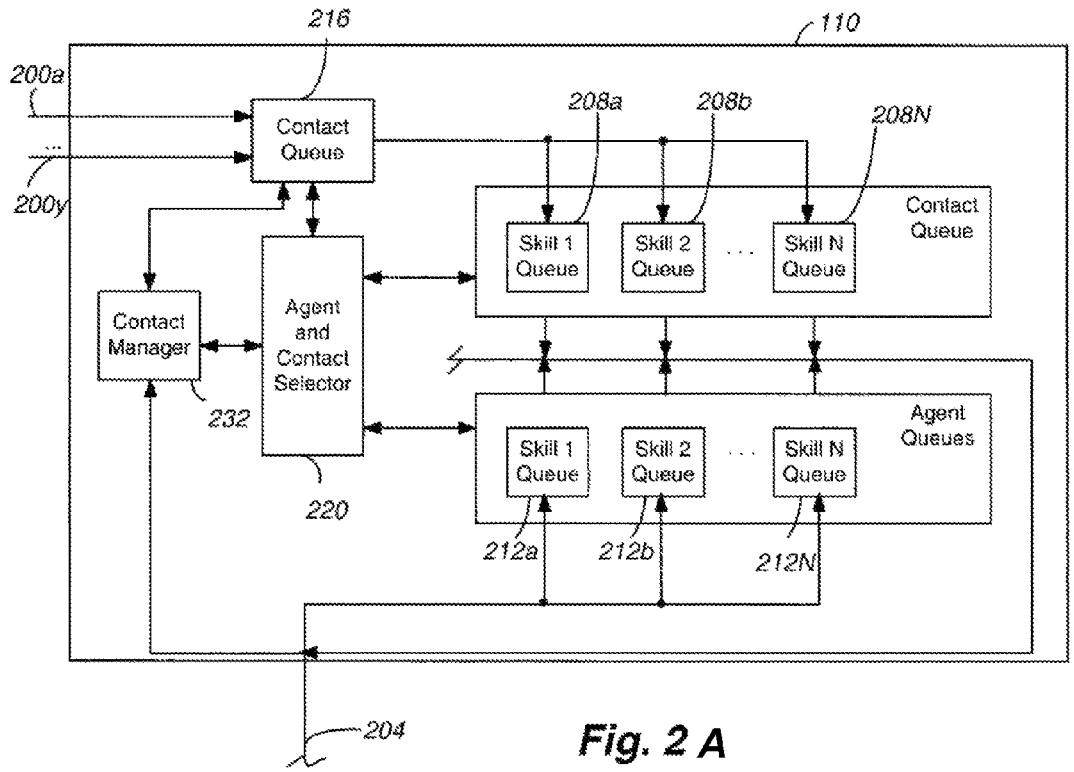
FIG. 2A is a system level block diagram depicting an administrator server in accordance with an embodiment of the present invention.

Referring to FIG. 2A, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices to be serviced by one or more preferred agents. Illustratively, the switch and/or server 110 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Private-Branch Exchange (PBX)-based ACD system; MultiVantage™ PBX, CRM Central 2000 Server™; Communication Manager™, and/or 58300™ media server.

Typically, the switch/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2A, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are either enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level. Although depicted for clarity sake as skills of the agents, these queues equally may represent agent attributes or some other parameters such that the agents are matched up with contacts on a preferred agent basis.

In one embodiment of the present invention, as depicted in FIG. 2A, a contact vector (queue) 216 is included among the control programs in the server 110. Contacts incoming to the contact center may be assigned by contact vector 216 to different contact queues 208a-n based upon a number of predetermined criteria, including customer identity, customer needs, contact center needs, current contact center queue lengths, customer value, and the agent skill, attributes or other parameters required for the proper handling of the contact and being designated as a preferred agent for a particular contact.

Agents who are determined to be preferred agents for a given contact, and are available for handling said contacts are assigned to agent queues 212a-n based upon the skills or attributes they possess. An agent may have multiple skills, attributes or other parameters, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in Communication Manager Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903, both incorporated herein by reference.

Figure 2B:
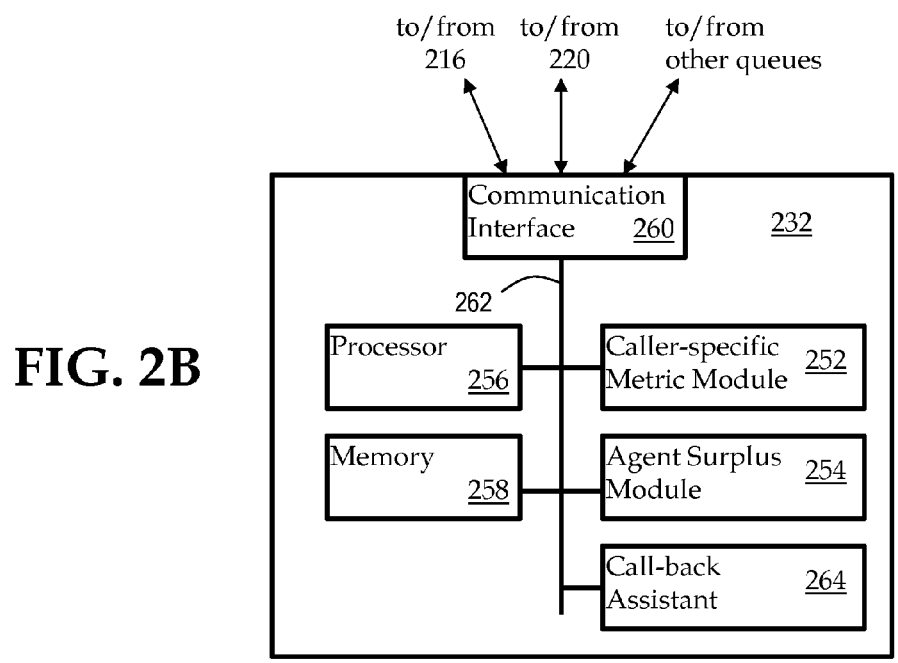
FIG. 2B is a block diagram of a contact manager in accordance with an embodiment of the present disclosure.

FIG. 2B illustrates a block diagram of a contact manager 232 in accordance with an embodiment of the present disclosure. Structure and function of FIG. 2B will be described below in greater detail in conjunction with FIG. 4.

In the conventional art, it is not uncommon for a customer to become frustrated in a conventional self-service support feature of a contact center, such as an IVR tree or menu trees for text-based contact. For well understood financial reasons, the options to reach an agent are not made readily available. Agents are expensive, and having more agents increases likelihoods that the agents will be underutilized.

However, whenever a contact center uses agents, there could be available agents to address the customer before a high-enough frustration level is reached by a customer. The high-enough frustration level may depend at least in part upon an estimated commercial value of the customer or the customer contact. The level may run inversely with the number of available agents, e.g., more available agents may allow for a lower frustration level at which to transfer a customer from the self-service support feature to an agent.

At times a call center may have a few free agents waiting for calls to be transferred to them. This scenario is referred to as an "agent surplus", and can be expressed as an absolute number or as a percentage of a total. At the same time customers may be interacting with the self-service support feature of the contact center—some customers may be having a hard time navigating through the self-service support maze.

Embodiments in accordance with the present disclosure add a predictive feature to self-service software so that the system can dynamically alter the user experience and offer various ways to connect to an agent before a high frustration level occurs.

In contrast to some systems of the known art that are able to integrate CRM processes and back-office data in order to offer a dynamic and self-service IVR system, embodiments in accordance with the present disclosure provide a more robust system and method to automatically detect sentiment and dynamically adjust a self-service support feature of a contact center, such as an IVR tree or menu trees for text-based contact system, based upon customer-centric factors described herein.

In contrast to some systems of the known art that provide and manage call handling treatments to callers interacting with an automated call-handling system, embodiments in accordance with the present disclosure provide dynamic thresholds for offering assistance based on the surplus agent availability and customer progress score. Embodiments may remove a customer from self-service support treatment and place that customer with agent treatment, based upon whether agent resources are available or can be made available.

In contrast to some systems of the known art that determine whether a caller may require assistance based solely on the amount of time in a self-service support feature of a contact center, such as an IVR tree or menu trees for text-based contact, and then transfer those callers to an operator where they may end up waiting in a lengthy queue with concomitant caller frustration, embodiments in accordance with the present disclosure take into account the availability of inbound and outbound agent resources before transferring such customers from self-service treatment to agent treatment. An inbound agent is an agent who is dedicated to responding to contacts incoming to the contact center from actual or potential customers. An outbound agent is an agent who is dedicated to making contacts from the contact center to actual or potential customers. Agent surplus may be determined separately for inbound agents and for outbound agents.

In contrast to some systems of the known art that transfer a caller to an agent if a likelihood of success is low enough to justify the cost, thus potentially causing a lengthy wait in queue for the caller, embodiments in accordance with the present disclosure provide improved satisfaction to even mildly confused customers by using the features described herein.

Figure 3:
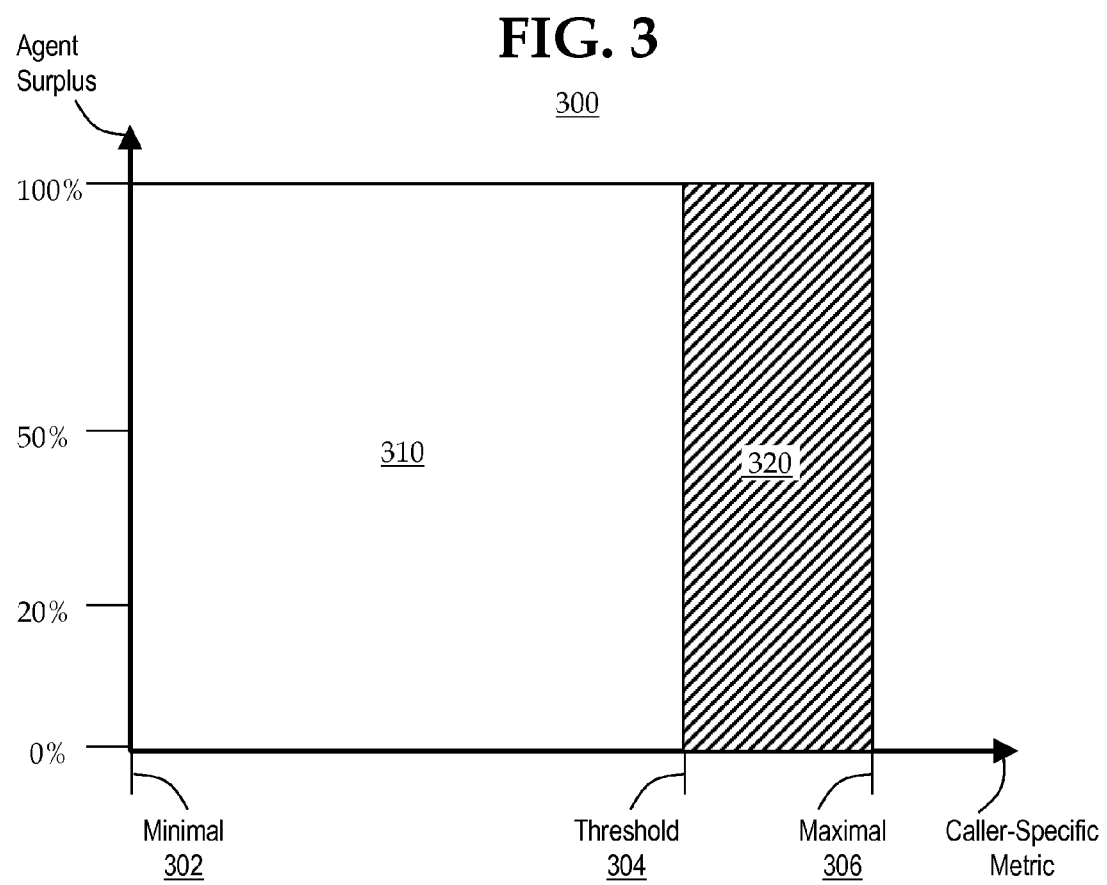
FIG. 3 illustrates an operational domain of a single contact for a self-service-enabled contact center as known in the background art.

FIG. 3 illustrates the operational domain 300 of a single call for a self-service transfer system of the known art. Operational domain 300 may be used to understand when in the known art the servicing of a caller may be kept within a self-service system, and when the servicing of a caller may be transferred to an agent. Operational domain 300 includes an abscissa (i.e., X-axis) that marks a caller-specific metric such as degrees of caller difficulty, i.e., the difficulty that the present caller is experiencing with the present call. Difficulty is meant in the sense of a lack of progress in achieving a goal of the call, such as making a purchase or obtaining desired information. The caller-specific metric may range from a minimal level 302 to maximal level 306. Although maximal level 306 is depicted as a maximum level, maximal level 306 should be interpreted as a relatively high level of caller difficulty such that additional caller difficulty has no additional effect upon call center operation or whether to intervene in the call.

Operational domain 300 includes an ordinate (i.e., Y-axis) that indicates a metric such as a percentage of agent surplus. A surplus agent is an agent whose work effort may be redirected substantially immediately for a different task. Percentage of agent surplus may vary between 0% (i.e., a very busy contact center) and 100% (i.e., a contact center with little work for the available agents).

Operational domain 300 further includes a sub-domain 310 and a sub-domain 320. Sub-domain 310 represents conditions under which the caller is handled by a self-service system. Sub-domain 320 is marked by diagonal shading and represents conditions under which a caller may be transferred to a live agent, or to a queue for a live agent, or scheduled to be transferred to a live agent, and so forth.

Operational domain 300 may be further augmented by additional metrics (not illustrated), which can be modeled as additional axes in N-dimensional space, N representing the total number of metrics. The N-dimensional space may be subdivided between non-overlapping sub-domains similar to sub-domain 310 and sub-domain 320.

Operational domain 300 illustrates that, for caller difficulty below a pre-determined threshold 304 (i.e., sub-domain 310), the caller is handled by a self-service system. The pre-determined threshold 304 may be configurable through a provisioning support system. For caller difficulty above the pre-determined threshold 304 (i.e., sub-domain 320), the caller is transferred from the self-service system to a live agent (or a queue for a live agent). The demarcation between sub-domain 310 and sub-domain 320 is independent of the amount of agent surplus. This produces a drawback of the known art, such that during times of high agent surplus, agents are available that could be helping customers who are experiencing less severe levels of caller difficulty, but such agents are not utilized. Conversely, at times of low agent surplus, customers are still transferred to an agent or agent queue, even though such transferred customers may have to wait in an agent queue for a longer than expected or longer than usual amount of time.

In the conventional art of operational domain 300, the boundary between self-service domain 310 and agent-assisted domain 320 is defined only for a caller-specific metric equal to the predetermined threshold 304. No boundary is defined or exists for any other values of the caller-specific metric other than the predetermined threshold 304.

With a static threshold such as the predetermined threshold 304, which is not dependent upon agent availability, callers who experience a level of difficulty above predetermined threshold 304 are always transferred to an agent. If agents are busy handling other callers this may degrade the service level agreement (SLA) of the call center.

Embodiments in accordance with the present disclosure improve upon the background art by adding a predictive feature to assignment processes running within the contact center, such that embodiments can dynamically alter a user experience and offer various ways to connect to an agent before a high frustration level occurs.

More particularly, embodiments are able to detect dynamically a level of agent surplus existing within a contact center, and correspondingly adjust a threshold level of customer difficulty that would result in a customer being transferred from a self-service system to a live agent or a queue for a live agent. The definition of a surplus agent or an agent surplus condition may vary from one contact center operator to another depending upon, e.g., business needs of the contact center operator. For example, a surplus agent may be deemed to be an agent who is not currently servicing a call, or an agent who has been idle for more than a configurable amount of time, or whose queue is less than a predetermined length, etc. An agent surplus condition may be deemed to be a condition in which the contact center has more than a predetermined number or percentage of surplus agents. Alternatively, an agent surplus condition may be a statistical entity, e.g., if an average waiting time to speak to an agent is targeted to be 30 seconds, then an agent surplus may exist if the actual average waiting time is currently 10 seconds.

Embodiments in accordance with the present disclosure provide a system and method that adaptively identifies the level of difficulty that users are having with the self-service system. Furthermore, embodiments dynamically connect such a customer with a surplus agent before the customer completes a traversal through the self-service menu, and (more importantly) before such a customer decides to abandon the self-service feature in frustration and terminate the contact session.

Embodiments in accordance with the present disclosure provide a dynamic self-service user experience which may be based on a progress score. The progress score is a measure of progress (e.g., a numeric measure) of a customer through a self-service support feature of a contact center, such as an IVR tree or menu trees for text-based contact, from initial contact until the contact is terminated such as by completion of a purchase or resolution of a technical support contact session. The progress score may be derived from a heuristic process that is constantly trained from historical data from a large population of previous customers, and updated by newly-completed contacts, in order to determine how closely a customer has followed the paths of previous successful and/or unsuccessful customers. The heuristic process may also considers parameters such as:

(1) Observation of repeated paths taken by a customer during the customer contact session. A repeated path is, for example, a path that a customer takes more than once through a menu tree such as by looping back or backing up. Repeated paths may be an indication that the customer is lost in a portion of the menu tree that does not apply to the customer's reason for contacting the contact center, or that the user may be calling for a reason not covered by the menu tree, and so forth.

(2) How long the customer spent in each menu, e.g., a long time while listening to an entire menu or a short time as a user makes a selection before an entire menu is presented. A longer amount of time may be an indication that the user is uncertain about a choice and may be in need of assistance, and conversely that a shorter amount of time is an indication that the user is less in need of assistance.

(3) Customer sentiment detection. For example, sentiment may be detected by how a user provides a voice response to a menu selection (e.g., volume, inflection, words of exasperation, etc.), how a user provides touch-tone inputs (e.g., rapid repeated button presses, very long button presses, etc.), how a user provides written responses (e.g., usage of all caps, exclamation marks, emoticons, grammar detection, etc.), and so forth.

The progress score does not need to be a precise numeric value. For example, the progress score may represent fuzzy ranges such as "high", "medium" and "low", perhaps with "very high" and "very low" added, and so forth.

In accordance with an embodiment, based on the progress score and the surplus of agents in the agents' pool, the customer may be proactively pulled out of the self-service feature and transferred to an agent or a queue for an agent.

In accordance with another embodiment, if the embodiment detects that the customer could benefit from being removed from a self-service system, but the contact center does not currently experience a sufficient agent surplus state, the customer may be offered a call-back (or similar) option. The call-back offer may vary depending upon their computed progress score and/or the importance of the customer (as measured by, e.g., potential size of order, identity of the customer or the customer's organization, social media footprint, reason for contacting the contact center, product involved, etc.). The variation may be, e.g., by offering a shorted call-back window in which to expect a call-back, or a faster call-back, or an option to pick a time for call-back, and so forth.

Furthermore, the lack of a sufficient agent surplus state may initiate a notification to a contact center supervisor in order to notify the supervisor of a potential agent staffing shortage. Similar notifications may be sent to contact center routing software. For example, if a large number of customers with a low progress score is experienced (e.g., because of many confused customers), the contact routing software may use the notification to trigger an automatic conversion of outbound agents to inbound agents. The step of converting an outbound agent into an inbound agent may be referred to as "blending."

As described herein, embodiments in accordance with the present disclosure may use one or more of several techniques to determine if a customer is confused. If the customer is confused, assistance may be offered by one or more of the following techniques:

1) Transferring the customer to a surplus inbound agent.

2) Blending outbound agents with inbound agents while customer is still in the automated system. This process may be accelerated if many customers are currently in the automated system with low progress scores.

3) Offering a call back with high call-back time accuracy by dynamically scheduling the blending of inbound agent to outbound agent. A computed 'progress score' can also be used to prioritize the customer in the callback queue so that highly challenged customers are more likely to receive a call back exactly when promised. Such customers may be upset and we do not want to make them even more upset by calling them later than promised.

FIG. 4 illustrates an operational domain 400 of a single contact for a self-service support feature of a contact center, such as an IVR tree or menu trees for text-based contact, in accordance with an embodiment of the present disclosure.

Operational domain 400 includes an abscissa (i.e., X-axis) that marks a customer-specific metric such as degrees of customer difficulty, i.e., the difficulty that the present customer is experiencing with the present contact. The customer-specific metric is an indication of when it would be desirable for a human agent to intervene in the interaction with the customer rather than have the interaction handled entirely by an automated method (e.g., an IVR system). Customer difficulty with the automated method is one circumstance. Another circumstance is if there might be an up-sell or cross-sell opportunity with this customer that would be more effectively handled by a human agent.

The customer-specific metric may be inversely related to a progress score. For example, a high progress score may correspond to a low customer-specific metric in the framework of FIG. 4, such that a high progress score indicates little need to intervene in the automated method unless the agent surplus is extremely high. Conversely, a low progress score may correspond to a high customer-specific metric in the framework of FIG. 4, such that a low progress score indicates high need to intervene in the automated method unless the agent surplus is extremely low.

In some circumstances, progress score may not closely relate to a customer-specific metric. For example, if a customer makes it most of the way through an automated menu tree (i.e., a high progress score), but then goes back and repeats portions of the automated menu tree, this may indicated confusion on the part of the customer and thus a high customer-specific metric despite the high progress score. In some circumstances, a progress score may be reset if the customer goes back and repeats part of an automated menu tree.

Further embodiments using different customer-specific metrics are contemplated. For example, suppose that a customer has contacted a contact center via a text-based message medium such as a web chat, e-mail, SMS text messages, and so forth. Rather than using a live agent to interact with all the text-based medium messages, embodiments initially may use an automated interpretive system to interpret text-based messages from a customer and compose a suitable reply via the text-based message medium. The interpretive system may query a product knowledge database for the substantive content of a message, and a linguistic database in order to interpret messages from a user and compose messages to a user. The goal is to provide to the customer an automated text-based response that is of sufficient quality (e.g., linguistically, responsiveness to the customer's question, etc.) to mimic human responses well enough that the customer does not suspect that they are interacting with an automated interpretive system.

However, the interpretive system may misunderstand or not fully understand the customer's problem, for example, if the customer cannot describe the problem in a clear and conventional description or if the customer uses colloquialisms, etc. A first confidence score may be associated with the analysis of customer communications by the automated interpretive system. The first confidence score may represent an interpretation of the most recent communication from the customer, or an interpretation of the entire conversation, and so forth. A second confidence score may be associated with a response to the customer generated by the automated interpretive system. The second confidence score may be a function of the first confidence score. The automated interpretive system may calculate or recalculate confidence scores each time a communication is received or sent, on an ongoing basis.

The automated interpretive system may monitor the confidence scores substantially continuously. If the first or second confidence levels fall below a predetermined configurable threshold, the automated interpretive system may treat confidence levels (in the context of operational domain 400) as customer-specific metrics that may trigger transfer of the text-based customer to a human agent (depending upon a current level of agent surplus), who can provide human-composed text-based responses to the customer.

A separate operational domain may be provided for different modes of communications, such that operational domains may take on different shapes for voice-based versus text-based communication. Agent surplus is calculated over the population of agents who can handle the respective mode of communications.

Operational domain 400 includes a sub-domain 410 and a sub-domain 420. Sub-domain 410 represents conditions under which the customer is handled by a self-service support feature of a contact center, such as an IVR tree or menu trees for text-based contact. Sub-domain 420 is marked by diagonal shading and represents conditions under which a customer may be transferred to a live agent, or to a queue for a live agent, or scheduled to be transferred to a live agent, and so forth. System state of contact center 100 for a specific customer may be indicated at least in part by whether contact center 100 should be operating in sub-domain 410 or sub-domain 420 as described in further detail below. In contrast to the known art as represented by operational domain 300 depicted in FIG. 3, operational domain 400 of FIG. 4 illustrates a relationship between customer difficulty on the abscissa and agent surplus on the ordinate, such that a boundary between sub-domain 410 and sub-domain 420 depends upon customer difficulty, or conversely depends upon a magnitude (e.g., a percentage) of agent surplus.

It should be noted that the boundary between self-service domain 410 and agent-assisted domain 420 is defined for a non-zero range of caller-specific metrics. FIG. 4 illustrates the non-zero range as substantially all values of the caller-specific metric. In contrast, the conventional art of FIG. 3 does not define a corresponding boundary for any values of the caller-specific metric other than the predetermined threshold 304, i.e., a single value or a zero range.

When viewed on an X-Y plot such as that shown in FIG. 4, the boundary between sub-domain 410 and sub-domain 420 may be described as varying or running from an (X, Y) coordinate of (low caller metric, high agent surplus) to an (X, Y) coordinate of (high caller metric, low agent surplus).

The boundary between sub-domain 410 and sub-domain 420 may be represented in memory 258 by a representation such as a table of agent surplus as a function of progress score. For a measured progress score, a monitored agent surplus value may be compared to the stored agent surplus value that is a function of progress score, using interpolation if necessary. A monitored agent surplus value greater than the stored agent surplus value will indicate operation in sub-domain 420. Other representations are possible.

For example in operational domain 400, when agent surplus is close to 100%, only a small amount of customer difficulty would be needed in order to consider transferring the contact from self-service treatment to a live agent. If the amount of customer difficulty is equal to the threshold 304, then an agent surplus of at least about 20% is needed in order to transfer a contact from self-service treatment to a live agent. If the customer has a great deal of difficulty with the self-service system, then almost any nonzero level of agent surplus is sufficient in order to transfer a contact from self-service system to a live agent or a queue for a live agent.

Although the boundary between sub-domain 410 and sub-domain 420 is depicted as a straight line, substantially any decreasing function of customer difficulty may be used. For example, a stair-step function may be used.

Operational domain 400 may be implemented by a server in contact center 100, e.g., by server 110. Server 110 may include a contact manager 232 in communication with an agent and contact selector module 220 as illustrated in FIG. 2A.

FIG. 2B illustrates a block diagram of a contact manager module 232 in accordance with an embodiment of the present disclosure. Contact manager 232 may include a customer-specific metric module 252 that monitors the progress of respective customer communications, and an agent surplus monitor module 254 that calculates a current level of agent surplus, e.g., based upon queue length and which agents are idle. Contact manager 232 may include a processor 256 coupled to a memory 258 and coupled to communication interface(s) 260, in order to implement the processes described herein. Components of contact manager are interconnected via an internal communication path 262. Processor 256 may be configured (e.g., through use of computer code and/or appropriate sensor interfaces) to detect a level of a customer-specific metric through use of customer-specific metric module 252 and monitoring of queues 208, 212, and a level of agent surplus through use of agent surplus monitor module 254. Processor 256 may then determine which sub-domain of operational domain 400 that the contact center 100 is currently operating in with respect to the specific customer being monitored. If processor 256 determines that the contact center 100 is currently using an automated method for customer interaction but is actually operating in the domain of sub-domain 420, processor 256 may raise a signal (e.g., a flag, a digital message, etc.) to indicate this condition, and then issue a signal or command that an operating state of the contact center 100 for this customer should transition from support through an automated method to support through a live human agent. The raising of the signal may be accomplished by use of a signal generator. The signal generator may be a circuit, or may be a module configured to be executed by processor 256.

FIG. 5 illustrates an operational domain 500 of a single contact for a self-service support feature of a contact center, such as an IVR tree or menu trees for text-based contact, in accordance with another embodiment of the present disclosure.

Operational domain 500 includes a sub-domain 510, a sub-domain 520 and a sub-domain 530. Sub-domain 510 represents conditions under which the customer is handled by a self-service system. Sub-domain 520 is marked by diagonal shading and represents conditions under which a customer may be transferred to a live agent, or to a queue for a live agent, or scheduled to be transferred to a live agent, and so forth. As with embodiment 400, a boundary between at least a portion of sub-domain 510 and sub-domain 520 depends upon customer difficulty, or conversely depends upon a magnitude (e.g., a percentage) of agent surplus.

Implementation of operational domain 500 is by use of contact manager 232, and proceeds similarly to the implementation of operational domain 400 by use of contact manager 232, as described earlier.

However, as compared to the embodiment of FIG. 4, operational domain 500 includes new sub-domain 530, which is represented in FIG. 5 by cross-hatching. Sub-domain 530 represents a combination of a sufficiently high customer difficulty coupled with a sufficiently low agent surplus, such that embodiments have determined that self-service support of the customer should be ended. The low agent surplus means that either it will be unlikely that a sufficiently-qualified agent will be available immediately, or there will be a relatively long wait time in queue before an agent is available. Instead, customers within sub-domain 530 will be handled by a call-back assistant 264.

When viewed on an X-Y plot such as that shown in FIG. 5, the boundary between sub-domain 510 and sub-domain 520 may be described as varying or running from an (X, Y) coordinate of (low caller metric, high agent surplus) to an (X, Y) coordinate of (high caller metric, low agent surplus). Sub-domain 530 may be described as occupying a region or combination of high caller metric and low agent surplus.

The call-back assistant 264 will schedule a call-back time and window that are suitable for the customer. The call-back time and window may be tailored to the customer in terms of the duration of the call-back window and increased selection and/or control over the call-back time. A more desirable customer or customer from a commercial perspective may be offered more desirable call-back times, or greater control over the choice of call-back times, or a shorter call-back time window, and so forth. For example, a contact center may have three different queues. One customer may be at a bronze level and may be placed in a bronze queue if the bronze customer is removed from an automated call-handling system. A silver customer may be placed in a faster-moving silver queue. Likewise, gold or platinum customers may be placed in an even faster-moving gold or platinum queue.

Embodiments in accordance with the present disclosure may include a scenario in which if a contact center cannot sufficiently help a customer at the present time, and if the contact center wants to automatically escalate service, but no agent is currently available, embodiments may ask the customer to approve the call-back window. Based on the customer's priority, higher priority customers may be offered a more desirable call-back time and/or window. A well known customer who provides a lot of business is a high-priority customer, and the contact center operator does not want to lose any business from this customer. There may be several levels of desirability, such that gold and silver customers receive better choices than a bronze customer.

Customer priority within the context of call-back may correspond to the offered time window size within which the contact center may guaranty to provide a call-back. As a customer's priority level escalates, the offered choices will improve commensurately. If the customer once was a highly-valued customer but not so much in recent times, the offered choices may begin to be less desirable.

In some circumstances, a quicker call-back window may be viewed as being more desirable. In other circumstances, a later call-back window (but not excessively later) may be viewed as being more desirable. For example, if a customer has fruitlessly spent an extended amount of time in an automated response system, an immediate call-back (if available) may not be wanted so that the customer can take a break, get something to eat or drink, attend to other scheduled business, etc. However, the customer may have time availability in, say, three hours hence, but does not want a lot of variation in that call-back time. So instead of a time window of three hours +/−30 minutes hence, a valuable customer may be offered a time window of three hours +/−5 minutes hence. The less valuable customer may be offered a time window of three hours +/−30 minutes hence. Other variations are possible, such as the customer specifying a desired call-back time in terms of times of day such as "a call in the evening."

FIG. 6 illustrates a state table 600 in accordance with an embodiment of the present disclosure. Table 600 illustrates various combinations of a progress score (column 601) and percentage of agent availability (for both inbound agents in column 603 and outbound agents in column 605), together with a resulting action such as: (1) column 607—whether to provide immediate assistance by a human agent; (2) column 609—whether to offer on-time call-back; and (3) column 611—whether to wait in queue for an agent per the expected wait time (EWT).

The various combinations of table 600 include: Line 652, in which a low progress score and a mid-level inbound agent surplus pool size results in immediate assistance. Line 654, in which a high progress score and a high inbound agent surplus pool size results in immediate assistance. Line 656, in which a low progress score and a mid-level outbound agent surplus pool size results in immediate assistance with blending. Line 658, in which a high progress score and a high-level outbound agent surplus pool size results in immediate assistance with blending. Line 660, in which a low progress score, a mid-level inbound agent surplus pool size and a high-level of outbound agent surplus pool size results in immediate assistance with blending. Line 662, in which a high progress score, a high-level inbound agent surplus pool size and a mid-level of outbound agent surplus pool size results in no immediate assistance but an offer to wait in queue. Line 664, in which a low progress score, a high-level inbound agent surplus pool size and a mid-level of outbound agent surplus pool size results in no immediate assistance with blending but an offer to call back. Other scenarios are possible.

With reference to the conditions of table 600 applied to the prior art, a caller who experiences a difficulty e.g., progress score of 0.1 is always transferred to an agent. The agent availability is not considered at all and the caller is queued for an agent, which may aggravate the caller and reduce customer satisfaction. In contrast, in accordance with embodiments of the invention, callers having trouble navigating the self-help system as based upon a computed progress score are offered immediate human assistance if agents are available or can be made available, or a call back with high call back time accuracy.

In the known art, a "performance indicator" is defined from the perspective of a call center. In contrast, embodiments in accordance with the present disclosure treat a "performance indicator" as a progress score from the perspective of the customer. For example, the performance indicator may indicate how well the customer is progressing in the self-help system, and whether the customer appears to be confused or challenged.

In the background art, "deviation" refers to an observed pattern of deviation in a performance indicator, e.g., whether customers are hanging up sooner than desired when presented with a certain call treatment. In contrast, embodiments in accordance with the present disclosure pertain to determining if the caller will benefit from having human assistance and then leveraging to maximum efficiency both surplus inbound and outbound agents.

FIG. 7 illustrates a flowchart of a process 700 in accordance with an embodiment of the present disclosure. Process 700 begins at step 702, at which contact center 100 receives a contact from a customer. The contact may be by substantially any medium supported by contact center 100, e.g., voice, text, web, instant message (IM), SMS text message, web form, etc.

Next, control of process 700 transitions to step 704 at which contact center 100 initially assigns the customer to an automated support system. For example, a voice call initially may be assigned to a self-service system, or a textual method of contact (e.g., email, SMS text message, IM, web form, etc.).

Next, control of process 700 transitions to step 706 at which contact center 100, including contact manager 232, monitors a progress score of the customer.

Next, control of process 700 transitions to step 708 at which contact center 100, including contact manager 232, monitors an agent surplus status of contact center 100. Agents may include both inbound agents and outbound agents.

Next, control of process 700 transitions to decision step 710 at which a comparison is made whether a system state of contact center 100 is within an operating sub-domain of agent support. In this context, system state is individualized to the customer from step 702, and is dependent upon the progress score monitored at step 706 and the agent surplus status monitored at step 708. Examples of operating sub-domains of agent support include sub-domains 420 and 520 of FIGS. 4-5. If the outcome of decision step 710 is negative, control of process 700 reverts back to step 706. This loopback implements substantially continuous monitoring. A delay or process priority may be implemented so as not to overtax contact center computing resources. If the outcome of decision step 710 is positive, control of process 700 continues to decision step 712.

At decision step 712, a decision is made whether a live agent is available, either immediately or within a configurably short waiting time. If the outcome of decision step 712 is positive, control of process 700 continues to decision step 714 at which the customer is assigned to the live agent or a queue for the live agent. If the outcome of decision step 712 is negative, control of process 700 transitions to step 716 at which a call-back to the customer is set up.

Embodiments of the present invention include a system having one or more processing units coupled to one or more memories. The one or more memories may be configured to store software that, when executed by the one or more processing unit, allows practice of processes and embodiments described herein, including at least in FIG. 7, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to improve self-service operation in a contact center, comprising:
    monitoring, by a processor of the contact center, progress of a customer of the contact center during an established self-service customer support session;
    monitoring, by the processor of the contact center, surplus status of agents in the contact center during the established self-service customer support session;
    calculating, by the processor of the contact center, a caller metric for the customer to characterize lack of monitored progress, wherein the caller metric varies inversely with monitored progress;
    determining, by the processor of the contact center, a system state related to the customer by use of the monitored progress and the monitored surplus status;
    setting, by the processor of the contact center, an indicator signal to a first state when the system state is in an agent-support domain, otherwise setting the indicator signal to a second state when the system state is in a self-support domain; and
    assigning, by the processor of the contact center, the customer to an agent-supported customer support session when the indicator signal is in the first state.

2. The method of claim 1, wherein assigning the customer to an agent-supported customer support session comprises:
    assigning the customer directly to a live agent.

3. The method of claim 1, wherein assigning the customer to an agent-supported customer support session comprises:
    assigning the customer to a queue for a live agent.

4. The method of claim 1, wherein a boundary of the agent-support domain is available for a non zero range of the caller metric.

5. The method of claim 1, wherein a boundary of the agent-support domain runs from a coordinate of (low caller metric, high agent surplus) to a coordinate of (high caller metric, low agent surplus).

6. The method of claim 1, further comprising:
    setting, by the processor of the contact center, the indicator signal to a third state when the system state is in a call-back-support domain; and
    setting, by the processor of the contact center, up a call-back to the customer when the indicator signal is in the third state.

7. The method of claim 6, wherein the call-back-support domain comprises a high level of the caller metric and a low level of the surplus status of agents.

8. The method of claim 6, wherein scheduling of the call-back is related to an importance of the customer.

9. The method of claim 6, wherein scheduling of the call-back is determined by the customer.

10. The method of claim 6, wherein scheduling of the call-back comprises controlling a timing of a call back window.

11. The method of claim 6, wherein scheduling of the call-back comprises controlling a duration of a call back window.

12. The method of claim 1, wherein progress of the customer of the contact centis calculated relative to historical data of previous customers.

13. The method of claim 1, wherein progress of the customer is measured by a metric, related to a menu tree, comprising one or more of: lack of repeating selections in the menu tree, or time spent in the menu tree.

14. The method of claim 1, wherein the surplus status of agents comprises a surplus status of inbound agents and a surplus status of outbound agents.

15. The method of claim 14, further comprising:
    converting an outbound agent to an inbound agent when the surplus status of outbound agents is higher than the surplus status of inbound agents.

16. A system to improve self-service operation in a contact center, comprising:
    a processor;
    a memory in communication with the processor storing instructions executable by the processor, wherein the processor, when executing the executable instructions:
        monitors progress of a customer of the contact center during an established self-service customer support session;
        monitors surplus status of agents in the contact center during the established self-service customer support session;
        calculates a caller metric for the customer to characterize lack of monitored progress, wherein the caller metric varies inversely with monitored progress;
        determines a system state related to the customer based on the monitored progress and the monitored surplus status;
        controls a signal generator to set an indicator signal to a first state when the system state is in an agent-support domain, otherwise control the signal generator to set the indicator signal to a second state when the system state is in a self-support domain; and
        assigns the customer to an agent-supported customer support session when the indicator signal is in the first state.

17. The system of claim 16, wherein a boundary of the agent-support domain runs from a coordinate of (low caller metric, high agent surplus) to a coordinate of (high caller metric, low agent surplus).

18. The system of claim 16, wherein the processor, when the executable instructions are executed:
    sets the indicator signal to a third state when the system state is in a call-back-support domain; and
    setting up a call-back to the customer when the indicator signal is in the third state, wherein the call-back-support domain comprises a high level of the caller metric and a low level of the surplus status of agents.

19. The system of claim 18, wherein scheduling of the call-back is related to an importance of the customer.

20. The system of claim 16, wherein the surplus status of agents comprises a surplus status of inbound agents and a surplus status of outbound agents; and wherein the processor, when the executable instructions are executed, converts an outbound agent to an inbound agent when the surplus status of outbound agents is higher than the surplus status of inbound agents.

\* \* \* \* \*